July 20, 1965 W. C. BROEKHUYSEN 3,196,234
ELECTRO-THERMAL CONTROL DEVICE
Original Filed Jan. 11, 1955 2 Sheets-Sheet 1
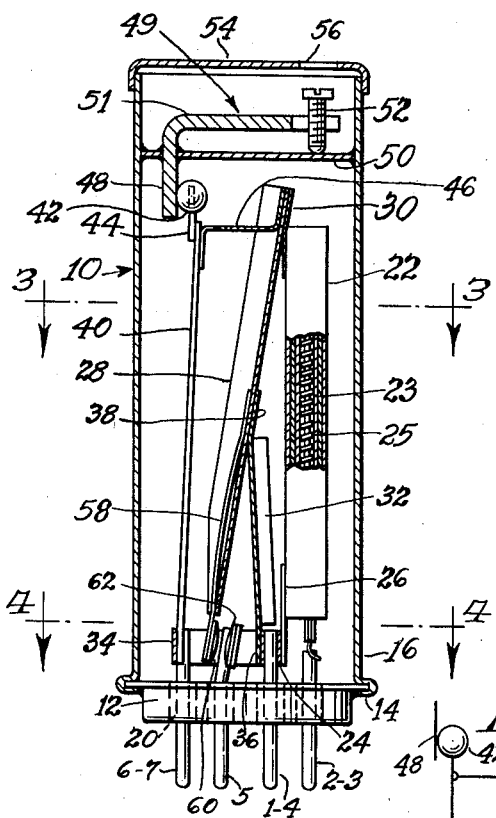
Fig. 1.
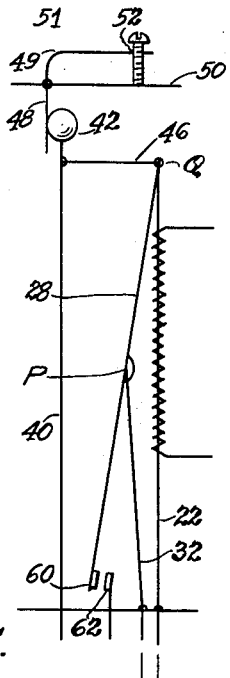
Fig. 2.
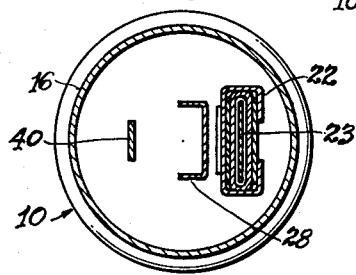
Fig. 3.
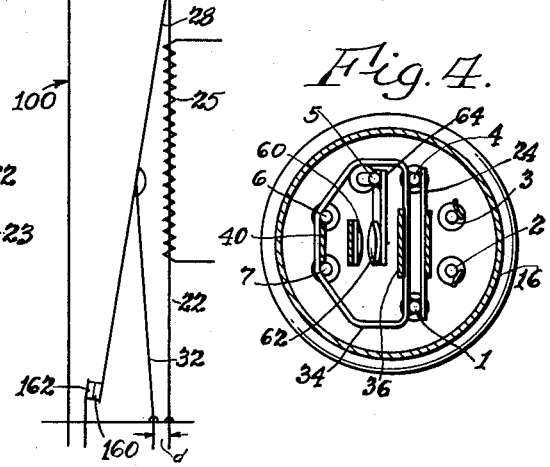
Fig. 5.
Fig. 4.
INVENTOR.
William C. Broekhuysen
BY
Wentworth R. Clapham
Attorney.

July 20, 1965  W. C. BROEKHUYSEN  3,196,234
ELECTRO-THERMAL CONTROL DEVICE
Original Filed Jan. 11, 1955  2 Sheets-Sheet 2

INVENTOR.
William C. Broekhuysen
BY
Wentwoth B. Clapham
Attorney.

United States Patent Office 3,196,234
Patented July 20, 1965

3,196,234
ELECTRO-THERMAL CONTROL DEVICE
William C. Broekhuysen, Brooklyn, N.Y., assignor to G-V Controls Inc., East Orange, N.J., a corporation of New Jersey
Continuation of application Ser. No. 481,123, Jan. 11, 1955. This application Mar. 13, 1958, Ser. No. 722,364
19 Claims. (Cl. 200—122)

The present application is a continuation of my earlier United States application for patent, Serial No. 481,123, entitled "Electrical Control Devices," filed on January 11, 1955, now abandoned, which parent application, in turn, is a continuation-in-part of my United States Patent No. 2,700,084 granted on January 18, 1955.

This invention relates to an electrical control device, and more particularly to electro-thermally operated relays.

The requirements of modern electrical design for compactness in construction, ruggedness and resistance to shock and vibration have resulted in conditions where electro-thermally actuated relays heretofore known in the art have become unsuitable because such relays could not stand up under the burden placed upon them.

Recent developments, especially in airborne equipment, have raised the requirements for shock and vibration resistance of electrical components to a point heretofore unknown, and at the same time have made imperative reduction in size and weight.

The present invention meets substantially all of the requirements mentioned hereinabove, and also overcomes successfully and satisfactorily disadvantages heretofore experienced in the art, especially within the field of electronic airborne equipment design where shock and vibration must be considered and provided for.

It is an object of the invention to provide an electro-thermally operated relay which is free from resonance over a substantially wider range of vibration frequencies than has been possible heretofore.

It is a further object of the invention to furnish a novel electro-thermally actuated relay which is capable of withstanding higher shocks of longer duration without damage and without false contact action.

The invention also consists of the provision of an electrothermally operated relay which can be adjusted readily, is simple and compact in construction, and of such ruggedness that it can meet the demands of the most exacting use required of electrical components.

The invention is further characterized by an electro-thermally actuated relay which is relatively easy to manufacture, and has good compensation over a wide range of ambient temperature, notwithstanding its compactness or smallness in size, and one wherein the controlling element may have widely varying time constants.

With these and other objects not specifically mentioned in view, the invention consists in certain combinations and constructions which will be described fully hereinafter, and then set forth in the claims hereunto appended.

In the accompanying drawings, which form a part of this specification, and in which the characters of reference indicate the same or like parts:

FIGURE 1 is a side elevation in cross-section of a preferred form of construction of electro-thermal relay having normally open contacts embodying my invention;

FIGURE 2 is a diagrammatic representation of the structure shown in FIGURE 1;

Figure 6:
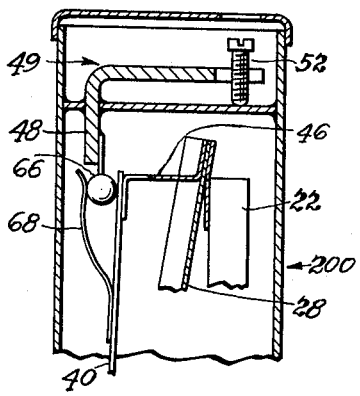
Figure 7:
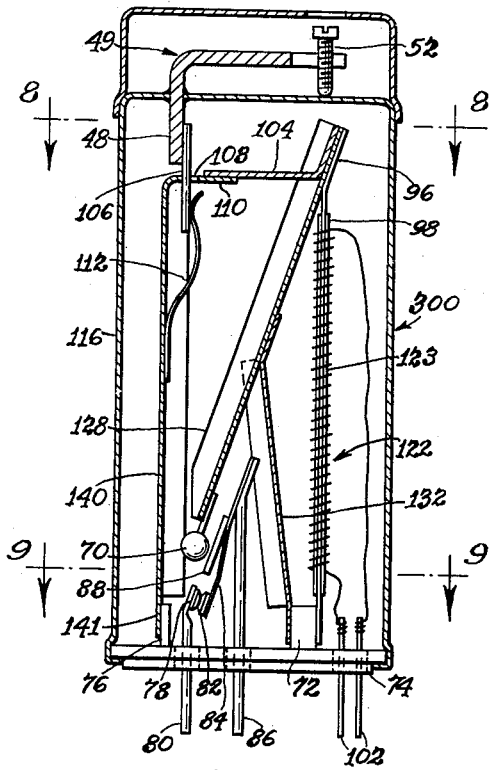
Figure 8:
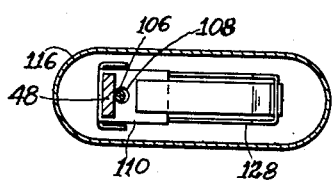
Figure 9:
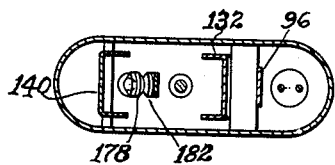
Figure 10:
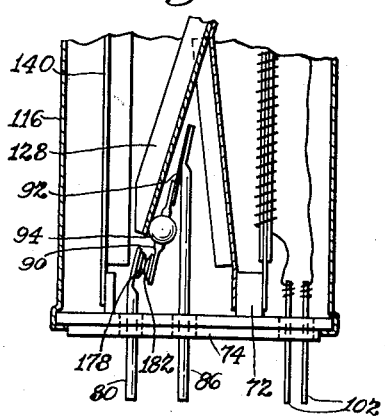

FIGURES 3 and 4 are transverse views taken respectively along lines 3—3 and 4—4 and in the direction of the arrows in FIGURE 1;

FIGURE 5 is a diagrammatic representation similar to FIGURE 2, but with normally closed contacts;

FIGURE 6 is a partial sectional side elevation of the upper part of an alternative design of electro-thermally operated relay embodying my invention;

FIGURE 7 is a cross-sectional side elevation of a further form of the invention;

FIGURES 8 and 9 are transverse sectional views taken along lines 8—8 and 9—9, respectively, and in the direction of the arrows as in FIGURE 7; and FIGURE 10 is a partial sectional side elevation of the lower part of a further alternative form of the invention.

The structure embodying the invention may be termed a thermal time delay relay. However, it may find applications and use for other functions, such, for example, as a discriminator or regulator for potential, current or frequency in electrical circuits. Therefore, whenever in the following specification or in the claims, the device made in accordance with the invention is referred to as a time delay relay, it is to be understood that such other functions are included because the construction of the device is substantially the same for all purposes. Accordingly, this reference is not used in a limiting sense.

In the preferred embodiment of the invention selected for purposes of illustration, shown in FIGURES 1, 2, 3 and 4, the electro-thermally operated relay, designated generally 10, is provided with a base 12 which is crimped and sealed, as at 14, into the bottom of a substantially cylindrical casing or housing 16. A plurality of pins 1–7, inclusive, are suitably rigidly and hermetically sealed into base 12, and are electrically insulated therefrom by glass beads 20. Pins 1–7 extend upwardly from base 12 into casing 16, and also project downwardly therefrom in order to provide the means for mounting relay 10 in known manner in a suitable circuit. Unless otherwise specified, all mechanical and electrical connections in this and alternative forms of the invention described hereinafter are preferably made by spot welding.

Referring to FIGURE 1, it will be seen that contained within housing 16 of relay 10 is an elongated electrically heatable primary controlling or timing member 22 which is resiliently pivotally supported on a bracket 24 by flat spring 26. Bracket 24 is rigidly attached to pins 1 and 4, as shown in FIGURES 1 and 4. An elongated generally channel shaped arm 28 is resiliently pivotally connected by flat spring 30 adjacent the upper end of controlling member 22. A generally channel shaped strut 32 is pivotally connected at its lower end, as viewed in FIGURE 1, to the inside of a ring 34 by a flexible extension 36, preferably forming an integral part thereof. The upper end of strut 32 is connected to the approximate center of arm 28 by a flexible extension 38 also conveniently formed integrally with strut 32. Ring 34 is rigidly fixed to pins 1, 4, 6 and 7.

As shown in FIGURE 4, one end of an elongated flat stabilizing spring member 40 is fixed to ring 34 at a point substantially opposite extension 36. Attached to the other or top end of spring member 40 is a short wire 44 which carries a non-conducting element such as glass bead 42. In the illustrated embodiment, glass bead 42 is fused to wire 44. A short, substantially horizontal leaf spring 46 extends between and connects spring member 40 to arm 28 adjacent their upper ends.

Referring to FIGURES 1 and 2, it will be seen that bead 42 engages the lower vertical end or shorter leg 48 of an L-shaped lever 49 is suitably mounted, as by brazing, on a diaphragm 50. Diaphragm 50 is brazed into casing 16 a short distance from the top. The upper part or longer leg 51 of lever 49 extends substantially horizontally over diaphragm 50, and carries at its end an adjusting screw 52. A cover 54 is detachably mounted on the top of housing 16, and is provided with an opening 56 through which a screw driver or other suitable tool may be inserted for engagement with the head of screw 52 for making desired adjustment described hereinafter. Spring member 40 is so biased as to always maintain firm and continuous contact between bead 42 and lever 49.

A spring 58, attached to the inside of contact control arm 28, is provided at its lower end with a contact element 60. This movable contact is adapted to coact with a fixed or stationary contact element 62 secured to bracket 64 mounted on pin 5. Spring 58 carried by arm 28 is so biased that it normally bears with a positive resilient pressure against the lower end of arm 28.

Relay 10 and the modified forms described and disclosed herein preferably are hermetically sealed. This is accomplished as in FIGURE 1 by forming a small hole (not shown) in diaphragm 50 which provides access to the interior of casing 16 in order to evacuate it. Thereupon, it may be filled with a dry, inert atmosphere, such as argon, after which the hole is sealed in known manner with a drop of solder.

In the embodiment of the invention illustrated in FIGURES 1–4, inclusive, controlling member 22 is of the internally heated type, such as disclosed in my co-pending application, Serial No. 254,544, filed November 2, 1951, now Patent 2,700,084, granted January 18, 1955. In the alternative forms of invention disclosed in FIGURES 7 and 10, heated controlling member 122 is of the so-called externally heated type.

Since the particular construction of heatable actuating or timing members 22 and 122 does not form a specific part of this invention, further detailed description thereof is deemed unnecessary. It is to be noted, however, that member 22 is provided with a heater 23 having a plurality of turns of high resistance wire 25, coupled by leads to pins 2 and 3. Member 22 is so constructed that there is intimate thermal contact between all parts of the heater 23 and the surrounding metal parts, and no substantial temperature differential can exist at any time between the parts of its assembly. Therefore, the energy storage is substantially evenly distributed throughout member 22 at all times while it is being heated by an electrical current passing through wire 25, and it will substantially instantly start to cool when this current is interrupted.

The operation of relay 10 is best understood by a consideration of FIGURE 2. The upper half of the contact control arm 28 and strut 32 together form a shallow V or bow which has a central flexing zone designated P. This shallow V or bow not only constitutes the contact supporting and controlling mechanism, but also compensates for changes in ambient temperature. Actuating or timing member 22 forms the string of the bow. The upper zone Q of the bow and member 22 are restrained by spring link 46 from substantial horizontal movement, but can move freely up and down when member 22 is heating or cooling. When member 22 is heated, it expands, and the bow or V is straightened slightly, whereupon arm or lever 28 swings about its pivot Q, and contact 60 moves into engagement with contact 62. Thus, the upper portion of arm or lever 28 forms a motion-receiving arm and the lower portion of the arm or lever 28 forms a motion-delivering arm.

Controlling member 22, arm 28 and strut 32 are made of the same metal, preferably stainless steel, or any other suitable metal or alloy. Thus, it is obvious that they have the same thermal expansion coefficient. Therefore, the position of contact 60 will not be affected by changes in ambient temperature.

The position of point Q may be adjusted horizontally by adjusting screw 52. In FIGURES 2 and 5, if the distance "$d$" between the lower ends of strut 32 and controlling member 22 is zero, there will be no substantial horizontal movement of contact 60 when point Q is moved horizontally. On the other hand, if the distance designated "$d$" is large, (that is, if "$d$" is a substantial fraction of the length of controlling member 22), the horizontal movement of contact 60 will be substantially greater than the horizontal movement of Q. There is a definite, rather small value of "$d$" for which a horizontal movement of Q will result in a substantially equal horizontal movement of contact 60. Thus, it will be seen that for suitably proportioned parts, the vertical movement of Q resulting from longitudinal expansion and contraction of actuating member 22, will result in a substantially amplified horizontal movement of contact 60, while any horizontal movement of Q resulting from adjustment of screw 52 is transmitted in a substantially 1:1 ratio to contact 60.

From these same FIGURES 2 and 5, it will further be clear that the structure, consisting of members 22, 28 and 32, is supported at three points, two at the base and point Q. If the initial position of this structure is such as to produce a wide gap between contacts 60 and 62, then the horizontal force exerted on this structure at Q by member 46, to reduce this gap may be towards the right, the force exerted by the base on actuating member 22 must be in a generally upward direction and the force exerted by the base on member 32 must be predominately downward. Therefore, when point Q is moved towards the right, as adjusting screw 52 is projected, actuating member 22 will be placed in a state of compression, and the compensating member, embracing the upper half of arm 28 and strut 32, will be predominately placed in a state of tension. Due to the V shape of the compensating member, it will also be placed in a state of bending. As this member consists of two substantially rigid portions joined by a flexible zone at P, (the apex of the V), the bending stresses will be substantially concentrated in this flexible zone.

FIGURES 1–4 show a relay 10 having normally open contacts wherein movable contact 60 is shifted into engagement with a fixed contact 62 due to the expansion of member 22 when heated. FIGURE 5 shows diagrammatically an alternative form of electro-thermally heated relay designated 100. In this construction the positions of the contacts are reversed 180° to provide a normally closed relay which opens when controlling or timing member 22 is heated by current passing through heater wire 25. In the type of relay shown in FIGURES 1–4, spring 58 permits arm 28 to travel beyond the point of closing contacts 60, 62 under the influence of continued heating of controlling member 22. In the relay shown in FIGURE 5, a spring similar to spring 58 (not shown) which mounts contact 160 is attached to the opposite side of arm 28 from that shown in FIGURE 1. This arrangement permits arm 28 to travel a predetermined distance before disengagement of contact 160 from fixed contact 162.

Relay 200 shown in FIGURE 6 is essentially the same in construction as relays 10 and 100. It differs, however, in that bead 66 is attached to the lower end of arm 48 of lever 49, and is clamped between a spring 68 secured to the upper portion of spring member 40, and the top of spring member 40. This construction makes it possible to make spring member 40 lighter, and additionally places less strain on ring 34. It also reduces the possibility of member 40 shifting momentarily as a result of mechanical shock.

In the constructions described hereinabove, the entire relay structure is electrically connected to one side of the contact and insulated from the base and shell or casing. In the designs shown in FIGURES 7–10, the structure is grounded and only the contacts and heaters are insulated.

In the relay 300 shown in FIGURES 7–9, bead 70 is attached to the lower end of arm 128. The lower ends of strut 132 and controlling member 122 are connected to opposite sides of a support block 72 mounted on base 74. A generally channel shaped elongated member 140 is provided at its lower end with a flexible extension 141 which is fastened to support block 76 on base 74. Casing 116 is attached to base 74 in the same manner as casing 16, in the form of invention shown in FIGURES 1–4, is attached to base 12.

Stationary contact 78 is attached directly to pin 80. Movable contact 82 is mounted on the free end of a flat spring 84, the other end of which is attached to pin 86. One end of a short stiff element 88 is fixed to spring 84 near its connection to pin 86. Spring 84 is so biased as to hold contact 82 in engagement with contact 78 with the free end of stiff element 88 disengaged from spring 84. The tension of spring 84 may be adjusted by bending the flattened end of pin 86.

In the embodiment shown in FIGURES 7–9, when actuating member 122 is heated, bead 70 due to the counter-clockwise movement of arm 128, resulting from the expansion of that member 122, engages the free end of stiff element 88, which in turn acts against spring 84. In so doing, it effects the disengagement of contact 82 from contact 78. This construction results in a slight rolling action of contact 82 against contact 78, thereby insuring positive electrical connection. The pins 80, 86 and 102 are mounted in base 74 in a manner similar to the mounting of pins 1–7 in relay 10 shown in FIGURE 1.

The assembly shown in FIGURE 10 is generally the same in construction as that shown in FIGURE 7. In this form, however, movable contact 182 is mounted on the flattened end of a rod 90. Stationary contact 178 is mounted on pin 80. The other end of rod 90 is also flattened and connected to the top of pin 86 by leaf spring 92. Glass bead 94 is fused at the center of rod 90. The lower end of arm 128 when moved counter-clockwise, as in the relay shown in FIGURE 7, engages bead 94 and on moving further effects the separation of contacts 178 and 182. This relay also includes a casing 116 attached to base 74, as described hereinabove.

Controlling member 122 in FIGURES 7 and 10 comprises a flat metallic ribbon 96 clamped between two strips of mica 98, slightly wider than ribbon 96. A number of turns of high resistance wire 123 are wound about the mica strips 98. The ends of this winding are connected to two pins 102 mounted in and insulated from base 74. Flat spring 104, linking the top of member 140 with the top of ribbon 96 and arm 128, is given an upward bias to maintain ribbon 96 under tension. Rod 106, attached to the shorter leg 48 of lever 49 extends downwardly through a small opening 108 in a horizontal flange 110 at the top of spring member 140. Spring 112 attached to spring member 140 bears with its free end against rod 106 and maintains that rod constantly in contact with one side of hole 108 to prevent play. Instead of the externally heated controlling member 122 shown in FIGURE 7, I can also use a "hot wire" element similar in construction to that shown and described in my co-pending application, Serial No. 322,905, filed November 28, 1952, now Patent Number 2,809,253, issued October 8, 1957.

It is obvious that other possible combinations and variations of the invention disclosed herein may be made. It is evident that all of them have in common the feature that the controlling movement is the longitudinal expansion and contraction of a metallic member under the influence of electrical heating which may be applied by an internal or external, insulated heater winding, or may be caused by an electrical current flowing through the metallic element itself. They also have in common that the controlling member is the string of a bow or V with a central flexure zone, and that the contact is actuated by an arm extending from one side of this bow or V in a direction substantially parallel to the axis of the controlling member.

Thus, among others, the several objects of the invention as aforenoted are achieved. It is apparent that numerous additional changes in construction and re-arrangement of the parts may be resorted to without departing from the spirit of the invention as defined by the claims.

I claim:

1. An electro-thermal relay comprising a frame, an elongated electrically heated control element, means pivotally supporting one end of said control element on said frame, an elongated compensating member, means pivotally supporting one end of said member on said frame adjacent said last-named means, means pivotally connecting the other end of said control element and said compensating member to each other, said compensating member comprising two substantially rigid parts joined by an intermediate flexible connection, a fixed contact mounted on said frame, a movable contact adapted to cooperate with said fixed contact, an actuating arm for said movable contact, said arm being mounted on said compensating member at a point substantially adjacent said flexible connection, whereby when said control member is heated and expands, said compensating member bends in a zone adjacent said flexible connection and said actuating arm is moved gradually to displace said movable contact relative to said fixed contact.

2. An electro-thermal control device comprising a frame, an elongated electrically heatable control element, means pivotally supporting one end of said control element on said frame, an elongated compensating member, means pivotally supporting one end of said compensating member on said frame at a point spaced a short distance from the point of support of said end of said control element, means connecting the free ends of said control element and said compensating member, adjustable means linking said connected ends of said control element and said compensating member to said frame, said linking means being operative to prevent substantial movement of said connected ends of said control element and said compensating member at right angles to the axes of said control element and said compensating member but permitting axial expansion and contraction of said control element in response to changes in its temperature when it is heated or cooled, manually adjustable means for effecting changes in the position of said connected ends of said control element and said compensating member at right angles to the axes thereof, a contact supported on said frame, a second contact movable with respect to said first-named contact and cooperable therewith, an actuating arm for said movable contact carried by said compensating member at a point substantially intermediate the length thereof, said compensating member being provided with a zone of flexure at a point adjacent the point of mounting of said arm, said short distance between said means pivotally supporting said control element and said means pivotally supporting said compensating member being so related and proportioned to said control element, said compensating member and said actuating arm, that the right angle movement of said connected ends of said control element and said compensating member resulting from manual adjustment of said linking means causes substantially equal movement of said movable contact, while axial expansion or contraction of said control element in response to heating or cooling thereof causes a greatly multiplied movement of said movable contact relative to said first-named contact.

3. An electro-thermal control device comprising a frame, an elongated electrically heatable control element pivotally mounted on said frame and provided with a heater, an elongated generally V-shaped compensating member mounted on said frame at a predetermined distance from said control element, said compensating member at the apex of said V having a zone of flexure, said control element and said compensating member being made of materials having the same temperature coefficient of expansion, means connecting the free ends of said control element and said compensating member, a fixed contact mounted on said frame, a second contact movable with respect to said first-named contact and cooperable therewith, an actuating arm for said movable contact carried by said compensating member at a point substantially intermediate the length of said compensating member and adjacent said zone of flexure, said heatable control element being adapted to expand lengthwise in response to the passage of a current through said heater, whereby said compensating member bends at said zone of flexure and said movable contact is moved relative to said first-named contact.

4. The control device defined in claim 3, including an elongated stabilizing member mounted on said frame, spring link means linking the free end of said stabilizing member and the connected ends of said control element and said compensating member, and means limiting the horizontal movement of said connected ends of said control element and said compensating member.

5. The invention defined in claim 4, wherein said limiting means includes a non-conducting body carried by the free end of said stabilizing member, and means engaged by said body under the normal bias of said stabilizing member for adjusting the position of said body to predetermine the amount of movement of said movable contact relative to said first-named contact.

6. An electro-thermal control device comprising a frame, an elongated electrically heatable control element provided with an electrical heater, means pivotally mounting said control element on said frame, a generally V-shaped elongated compensating member, means pivotally mounting one end of said compensating member on said frame, said compensating member being provided with a zone of flexure at the apex of said V, means connecting the free ends of said control element and said compensating member together, an elongated flat spring stabilizing member spaced from and substantially parallel to said control element, means supporting one end of said last-named member on said frame, a spring link connecting the ends of said control element and said compensating member to the free end of said stabilizing member, and means carried by the free end of said stabilizing member adapted to prevent movement of said connected ends of said control element and said compensating member at right angles to the axes of said element and said member while permitting axial expansion and contraction of said control element in response to the heating and cooling thereof, a fixed contact mounted on said frame, a movable contact carried by said compensating member, said compensating member being adapted in response to the passing of a current through said heater of said control element to flex at said zone of flexure towards said control element and move said movable contact relative to said fixed contact.

7. The control device defined in claim 3 including an elongated stabilizing member mounted on said frame provided with a flange having an opening, an adjusting lever having a short leg and a long leg, a pin mounted on said short leg of said lever and extending through said opening, and a spring mounted on said stabilizing member and engaging said pin to maintain said connected ends of said control element and compensating member against lateral movement except when said lever is manually adjusted.

8. An electro-thermal control device comprising a frame, an elongated electrically heatable control element, means pivotally mounting said control element on said frame, a generally V-shaped elongated compensating member, means pivotally mounting one end of said compensating member on said frame, said compensating member being provided with a zone of flexure at the apex of said V, means connecting the free ends of said control element and said compensating member, an elongated resiliently pivotally mounted stabilizing member spaced from and substantially parallel with said elongated control element, means supporting one end of said stabilizing member on said frame and biasing said stabilizing member away from said control element, a spring link joining the connected ends of said control element and said compensating member to the free end of said stabilizing member, and means coacting with the free end of said stabilizing member for preventing substantial lateral movement of said connected ends of said control element and said compensating member while permitting longitudinal expansion of said control element for moving said compensating member in response to the heating of said control element.

9. The control device defined in claim 8, including a fixed contact mounted on said frame, a movable contact mounted on said frame, and means carried by said compensating member for moving said movable contact relative to said fixed contact.

10. The control device defined in claim 8 including a fixed contact mounted on said frame, a movable contact, a flat spring mounting said movable contact, a post on said frame supporting said spring, a stiffener plate attached to said spring, said compensating member having an elongated portion extending downwardly from said zone of flexure, and a bead mounted on the free end of said portion adapted to engage said stiffener plate and flex said spring to move said movable contact relative to said fixed contact in response to the elongation of said control element when heated and the resulting flexing of said compensating member.

11. The control device defined in claim 8 including a fixed contact mounted on said frame, a post mounted on said frame, a flat spring attached at one end to said spring, a movable contact, a contact arm supporting said contact attached to said flat spring and a bead on said contact arm adapted to be engaged by said compensating member whereby in response to the elongation of said control element when heated said compensating member engages said bead and displaces said movable contact relative to said fixed contact.

12. The control device defined in claim 11 including an hermetically sealed casing and adjusting means located exteriorly of said casing for effecting controlled lateral movement of said connected ends of said control element and said compensating member.

13. The control device defined in claim 3, including adjusting means on said frame, means coupling said adjusting means to the connected ends of said control element and said compensating member, and means for moving said adjusting means to vary the position of said connected ends of said control element and said compensating member.

14. The invention defined in claim 3, including an adjusting device on said frame, means linking one end of said device with the connected free ends of said control element and said compensating member, and means for moving said adjusting device to vary the operative position of said control member and said compensating member.

15. In a hermetically sealed time delay control device to be connected in a current-carrying circuit, a thermally responsive actuating member having one end connected to a point of reference in said control device and communicating with said circuit to allow the free end of said member to expand longitudinally relative to said point of reference in response to thermal changes caused by variations in the current in said circuit, an integral control member connected to said point of reference a spaced distance from said actuating member and to the free end of said actuating member, adjustable means to engage said control member for exerting simultaneously sufficient force to move said actuating member into a compression state and to place said control member under predetermined tension and bending to regulate the time delay of said control device, and means in operable relation with said control member including a switch to be opened and closed in response to signals from said actuating member.

16. In a hermetically sealed time delay control device to be connected in a current-carrying circuit, a thermally responsive actuating member having one end connected to a point of reference in said control device and communicating with said circuit to allow the free end of said member to expand longitudinally relative to said point of reference in response to thermal changes caused by variations in the current in said circuit, an integral control member connected to said point of reference a spaced distance from said actuating member and to the free end of said actuating member, means to engage said control member for exerting simultaneously sufficient force to place said actuating member in a compression state and to place said control member under predetermined tension and bending to determine the time delay of said control device, and means in operable relation with said control member including a switch to be opened and closed in response to signals from said actuating member.

17. A time-delay control device having in combination, an assembly comprising two mutually adjacent elongated and longitudinally heat-expansible elements restrained, as to movement in a direction transverse to their lengths, only at their extremities, the first extremities of said elements being fixed at respective points relatively close to each other and the second extremities of said two elements being connected together, said assembly including lever means extending from the interconnected extremities of said elements; electric heating means in efficient thermal relation to a first of said elements only for expanding it, whereby to subject to displacement in said direction a portion of the second element; a motion-receiving arm included in said lever means, having one of its extremities at a portion of the second element thus subjected to displacement; means fixing the other extremity of said motion-receiving arm as to displacement in said direction whereby to provide a fulcrum about which said motion-receiving arm is rocked; a motion-delivering arm also included in said lever means and having an extremity moved by the rocking of the motion-receiving arm; and control means responsive to the movement of said last mentioned arm extremity.

18. The subject matter claimed in claim 17, further including a casing in which said elements and said heating and lever and control means are enclosed, and wherein said extremity-fixing means comprises an element extending from the casing into association with said lever means.

19. The subject matter claimed in claim 17, further including a casing in which said elements and said heating and lever and control means are enclosed, and wherein said extremity-fixing means comprises an element extending from the casing into association with said lever means and adjustable in said direction.

References Cited by the Examiner

UNITED STATES PATENTS

| | | | |
|---|---|---|---|
| 986,801 | 3/11 | Claxton | 200—137 |
| 1,111,789 | 9/14 | Freas | 200—122 |
| 1,215,665 | 2/17 | Landis | 219—25 |
| 1,294,141 | 2/19 | Mulvany et al. | 219—25 |
| 2,321,049 | 6/43 | Schmidinger | 200—113 |
| 2,412,483 | 12/46 | Warrington | 200—122 |
| 2,664,483 | 12/53 | Broekhuysen | 200—137 |
| 2,700,084 | 1/55 | Broekhuysen | 200—122 |
| 2,777,969 | 1/57 | Svensson | 200—122 |
| 2,817,731 | 12/57 | De Falco | 200—113 |
| 2,961,516 | 11/60 | Broekhuysen | 200—122 |

FOREIGN PATENTS

| | | |
|---|---|---|
| 20,085 | 9/13 | Great Britain. |
| 21,540 | 9/12 | Great Britain. |
| 688,264 | 3/53 | Great Britain. |

BERNARD A. GILHEANY, *Primary Examiner.*

MAX L. LEVY, RICHARD M. WOOD, *Examiners.*